United States Patent
Arques et al.

(10) Patent No.: US 9,558,706 B2
(45) Date of Patent: Jan. 31, 2017

(54) IMAGING DEVICE WITH ZERO OHMIC DROP IN A DATA CONDUCTOR

(75) Inventors: Marc Arques, Grenoble (FR); Jean-Luc Martin, Saint Geoire en Valdaine (FR); Arnaud Peizerat, Grenoble (FR)

(73) Assignees: Commissariat A L'Energie Atomique ET Aux Energies Alternatives, Paris (FR); Trixell S.A.S., Moirans (FR)

( * ) Notice: Subject to any disclaimer, the term of this patent is extended or adjusted under 35 U.S.C. 154(b) by 402 days.

(21) Appl. No.: 13/876,837

(22) PCT Filed: Sep. 28, 2011

(86) PCT No.: PCT/EP2011/066937
§ 371 (c)(1),
(2), (4) Date: Apr. 16, 2013

(87) PCT Pub. No.: WO2012/041935
PCT Pub. Date: Apr. 5, 2012

(65) Prior Publication Data
US 2013/0207960 A1   Aug. 15, 2013

(30) Foreign Application Priority Data
Sep. 29, 2010   (FR) ...................... 10 57848

(51) Int. Cl.
*G09G 3/36* (2006.01)
*H04N 5/365* (2011.01)
*H04N 5/3745* (2011.01)

(52) U.S. Cl.
CPC .......... *G09G 3/3696* (2013.01); *H04N 5/3658* (2013.01); *H04N 5/3745* (2013.01)

(58) Field of Classification Search
CPC ........................................... H04N 5/335–5/378
(Continued)

(56) References Cited

U.S. PATENT DOCUMENTS 7,742,089 B2 * 6/2010 Maruyama ........ H01L 27/14609
250/208.1
2009/0079856 A1   3/2009 Yahazu
2009/0085141 A1   4/2009 Peizerat et al.

FOREIGN PATENT DOCUMENTS

EP   1416722 A1   5/2004
FR   2921788 A1   4/2009
(Continued)

OTHER PUBLICATIONS

English machine translation of WO2009/043887.*
(Continued)

*Primary Examiner* — Renee Chavez
(74) *Attorney, Agent, or Firm* — Baker Hostetler LLP

(57) ABSTRACT

An imaging device comprising comprises a matrix of pixels, at least one data conductor connected to several pixels of the matrix, organized row-wise and successively transporting signals delivered by respectively the pixels of the row and an electronic current generator supplying several pixels, each of the pixels comprising: a transistor delivering at the node of the pixel, the signal delivered by the pixel considered and wherein can flow a bias current from the current generator, and a first electronic switch connecting the node of the pixel to the data conductor associated with this pixel as a function of a selection signal of the pixel. Each of the pixels comprises a second electronic switch, distinct from the first electronic switch, joined to the node of the pixel, the current arising from the generator to be made to flow in the transistor as a function of the selection signal for the pixel.

11 Claims, 4 Drawing Sheets

(58) Field of Classification Search
USPC ................... 250/214 A, 208.1; 348/294–324
See application file for complete search history.

(56) References Cited

FOREIGN PATENT DOCUMENTS

| | | |
|---|---|---|
| JP | 2005-277513 A | 10/2005 |
| WO | 2009/043887 A1 | 4/2009 |

OTHER PUBLICATIONS

English translation of reference of record: JP2005-277513.*
Office Action in Japanese Patent Application No. 2013-530724, dated Jul. 21, 2015.

* cited by examiner

IMAGING DEVICE WITH ZERO OHMIC DROP IN A DATA CONDUCTOR

CROSS-REFERENCE TO RELATED APPLICATIONS

This application is a National Stage of International patent application PCT/EP2011/066937, filed on Sep. 28, 2011, which claims priority to foreign French patent application No. FR 1057848, filed on Sep. 29, 2010, the disclosures of which are incorporated by reference in their entirety.

FIELD OF THE INVENTION

The invention relates to an imaging device. The invention can be implemented for image capture in a detector.

BACKGROUND

This type of device comprises a large number of photosensitive points called pixels generally organized as a matrix or strip array. In a detector, a pixel represents the elementary sensitive element of the detector. Each pixel converts the electromagnetic radiation to which it is subjected into an electrical signal. The electrical signals arising from the various pixels are collected during a phase of reading the matrix and then digitized so as to be able to be processed and stored to form an image. The pixels are formed of a photosensitive zone delivering a current of electric charges as a function of the flux of photons which it receives, and of an electronic circuit for processing this current. The photosensitive zone generally comprises a photosensitive element, or photodetector, which may for example be a photodiode, a photoresistor or a phototransistor. Photosensitive matrices of large dimensions which may possess several million pixels are found.

The radiation detector can be used for the imaging of ionizing radiations, and notably X rays or γ rays, in the medical sector or that of nondestructive testing in the industrial sector, for the detection of radiological images. The photosensitive elements make it possible to detect a visible or near-visible electromagnetic radiation. These elements are hardly, if at all, sensitive to the radiation incident on the detector. Use is then frequently made of a radiation converter called a scintillator which converts the incident radiation, for example X-ray radiation, into a radiation in a band of wavelengths to which the photosensitive elements present in the pixels are sensitive. An alternative consists in producing the photosensitive element from another material carrying out the direct conversion of the X-ray radiation into electric charges. This is the case for example for matrices in which a first pixellated substrate made of Cadmium Telluride (CdTe) is connected pixel by pixel to a CMOS reading circuit which therefore no longer possesses the detection function.

It is known to produce an electronic processing circuit by means of a voltage follower making it possible to read the current of charges accumulated in the photosensitive element. A current source ensures the power supply for the pixel during its reading. An exemplary imaging device thus produced is represented in FIG. 1.

This figure schematically presents a matrix of two rows and two columns to simplify understanding. Four pixels are formed, each at the intersection of a row and column. Of course the real matrices are generally much larger.

Each pixel comprises a photosensitive zone represented here by a photodiode D and an electronic processing circuit formed of three transistors T1, T2 and T3. In the figure, the labels of the photodiode D and of the three transistors are followed by two coordinates (i,j) that can take the rank of the row for i and the rank of the column for j.

The pixels of one and the same column or more generally of one and the same row share a transistor T4 and a reading circuit S situated at the column end. The transistor T4 and the reading circuit S are linked to the pixels of the column by means of a conductor Col. The pixels of one and the same row are joined to four conductors conveying signals Phi_line, Vdd, V_ran and Phi_ran making it possible to control each of the rows of pixels.

The transistor T1 makes it possible to reinitialize the voltage of the cathode of the photodiode, to the voltage V_ran, during a phase of reinitializing the matrix during which the control signal Phi_ran is active.

After reinitialization, the illumination received by the photodiode D causes the potential of its cathode to decrease during an image capture phase.

This image capture phase is followed by a reading phase during which the potential of the photodiode D is read. Accordingly, the transistor T3 is turned on, the latter therefore having a role as switch, by virtue of the command Phi_line applied to its gate.

The transistor T2 operates as follower, and the transistor T4 operates as current source. The transistors T2 and T4 then form a voltage-follower stage which copies the voltage present on the cathode of the photodiode D, and reproduces it, to within a shift, on the input of the reading circuit S at the column end. To carry out its copyover, the transistor T2 requires a bias current flowing in its drain and its source. This current is imposed by a current generator formed by a transistor T4 common to several pixels. In the example represented, the transistor T4 is common to a column of pixels.

The voltage Vs present at the input of the reading circuit S can be expressed:

$$Vs = Vp - V_T - K \tag{1}$$

Where Vp is the voltage of the cathode of the photodiode, $V_T$ is the threshold voltage of the transistor T2, and K is a constant related inter alia to the value of the current delivered by the transistor T4.

The voltages V_ran and Vdd are often identical.

The phase Phi_line of a row n of a matrix is often the same as the phase Phi_ran of the preceding row n−1. In this case the integration period for the signal upstream of the follower lasts, for row n−1, from the end of the addressing of row n, until the addressing of row n−1 at the following image. The reinitialization and reading phases are therefore different for each row. One speaks of circular addressing of the rows, well known in the literature by the name "rolling shutter".

The addressing circuits (generally shift registers) generating the control signals Phi_line and Phi_ran are not represented in the figure and are disposed at the row end.

The various outputs of the reading circuits S of the various columns are thereafter multiplexed in a register, not represented in the figure, so as to obtain a video signal of a row.

It is also possible to use just a single current-source transistor T4, for the whole of the matrix, on condition it is switched successively onto the various columns, in tandem with the reading of these same columns.

In practice, each column Col exhibits a lineal resistance represented in the form of a resistance R_pix for each pixel. Relation (1) is correct only at the level of the output node of the pixel, that is to say at the level of the source of the transistor T2. But when this voltage is situated at the end of the columns, on the input of the reading circuit S, it is marred by an ohmic shift related to the resistance of the transistor T3 and to the number n of pixels separating the pixel selected from the reading circuit S along the column Col. The number n corresponds to the rank of the pixel read in the matrix. More precisely, the voltage Vs is expressed:

$$Vs = Vp - V_T - K - I \times (R(T3) + n \times R\_pix) \quad (2)$$

The ohmic shift is troublesome since it depends on the rank of the pixels read and it therefore introduces a variable skew into the reading of the voltages Vp of the photodiodes.

A solution consists in decreasing the lineal resistance value R_pix of the columns Col by increasing the width of tracks forming the column Col conductors. This solution nonetheless presents several drawbacks.

The increase in width of the tracks uses some surface area of the substrate on which the matrix is produced, and therefore reduces the useful surface area in each pixel for photodetection.

The increase in width of the tracks also increases their electrical capacitance. Now, the voltage of the columns changes upon the addressing of each new row, since it represents at each row the illumination of the corresponding pixels. Increasing the electrical capacitance of the column therefore makes it necessary to feed (or to extract) further charges upon each change of row. This increase in the current increases the ohmic drop, thereby reducing the effect initially sought. Ultimately, this is manifested by an increase in consumption, or by a limitation of the reading speed.

The structure of such a pixel with three transistors therefore finds a limit in respect of matrices of large dimensions in which the column capacitances and the column resistances are significant. These matrices cannot be read rapidly.

Another solution consists in replacing the current sources, common to a column, with current sources disposed in each pixel by means of an additional transistor such as for example described in patent application No. WO2009/043887.

The output column Col conductor then no longer has the role of conveying the bias current for the follower stage. It is used only as a device for observing the output voltage of the pixel. It works at zero current, outside of the current transients necessary at each row transition to establish the new voltage value. At the end of these transients, the current on the column conductors being zero, the voltage is the same over the whole of the length of these columns, and in particular the voltage at the column end does indeed represent, with no shift, the voltage of the pixel. The lineal resistance R_pix no longer therefore causes any voltage drop along the column conductor.

This solution nonetheless has the defect, by introducing a current-source transistor into each pixel, of requiring the corresponding control voltages on the gate and the source of this transistor.

Distribution of the gate voltage over a matrix is done without any ohmic drop, since there is no corresponding consumption. But the distribution of the source voltage undergoes ohmic drops since it must generate the bias current for the follower transistor T2.

The source voltage of the additional transistor varies from one pixel to the next as a function of the lineal resistance of the conductor conveying this voltage. The potential difference between gate and source defines the value of the current delivered by these transistors to bias each follower transistor T2. These variations in bias current from one pixel to another therefore create, as in the pixel with three transistors, dispersions on the output signals.

It is possible to alleviate this drawback by keeping the potential difference between source and drain of the additional transistor constant for all the pixels. For this purpose, a voltage drop equal to that which exists on the sources of the current-source transistors is created on their gates, by connecting them to a lateral resistive bar which reproduces the same voltage drop as that which exists on the sources of the additional transistors as described in patent application FR 2 921 788. The resistive bar is linked to all the gates of the additional transistors of a column and is supplied between two voltages, high and low, at the ends of the bar.

This solution operates well, but is fairly complex to put in place and to pilot, since it requires two voltages, high and low (Vg1, Vg2) for biasing the lateral resistive bar.

Another solution for circumventing the problem of ohmic drop has for example been proposed in patent application EP 1 416 722 A1. This solution consists in displacing the current source onto the opposite edge of the matrix, with respect to the edge on which the reading circuits S are situated.

The bias current for the pixel goes from the selected pixel up to the current source, and therefore creates an ohmic drop in the part of the column conductor above the selected pixel. But the lower part, connected to the reading circuit S, is not traversed by any current, and does not therefore undergo any ohmic drop. The lower end of the pixel is therefore properly representative of the voltage of the pixel.

However, this solution exhibits several limitations. It is necessary to have the space required to produce the source at the top of the column. And in the case where several matrices have to be assembled or abutted, for example in fours, so as ultimately to obtain a sensitive area four times as large, then the top of the column is situated at the limit of the desired smallest possible abutment zone. It is therefore not desirable to place in this abutment zone components not belonging to the actual pixels. This would distance the sensitive parts of the elementary matrices, thus creating a dead line in the final image at the level of the abutment.

Moreover, the voltage drop between the addressed pixel and the current source must not be too large, so that the current-source transistor remains in saturated mode, and properly fulfills its current-source function. And as described previously, if the width of the column is increased in order to reduce this voltage drop, this will increase consumption.

SUMMARY OF THE INVENTION

One aim of the invention is to solve the problem of the ohmic drops on the output path of the information arising from the pixel, without adding any component at the top of the columns, and without requiring any bias scale for the gates of the current-source transistors.

For this purpose, the subject of the invention is an imaging device comprising a matrix of pixels, at least one data conductor being able to be connected to several pixels of the matrix, organized row-wise and making it possible to successively transport signals delivered by respectively each of the pixels of the row and an electronic current generator supplying several pixels, each of the pixels of the matrix comprising:

a transistor delivering at one of its terminals, termed the node of the pixel, the signal delivered by the pixel considered and in which there can flow a current arising from the current generator, and a first electronic switch making it possible to connect the node of the pixel to the data conductor associated with this pixel as a function of a selection signal of the pixel, characterized in that each of the pixels of the matrix furthermore comprises a second electronic switch, distinct from the first electronic switch, joined to the node of the pixel and enabling the current arising from the generator to be made to flow in the transistor as a function of the selection signal for the pixel.

The signals delivered, transported by the various data conductors, are each read by a reading circuit S disposed at the end of a data conductor and formed by a voltage reading circuit having high input impedance.

The invention applies to any pixel layout in which the output node of the pixel must be connected both to a current source and to a follower amplifier disposed at the column end.

The follower amplifier can simply be a voltage follower.

BRIEF DESCRIPTION OF THE DRAWINGS

The invention will be better understood and other advantages will become apparent on reading the detailed description of an embodiment given by way of example, said description being illustrated by the attached drawing in which.

DETAILED DESCRIPTION

So as not to overburden the description of the two embodiments of the invention, the matrices represented comprise only four pixels. Of course the real matrices are generally much larger. Moreover, the same elements will bear the same labels in the various figures.

Figure 2:
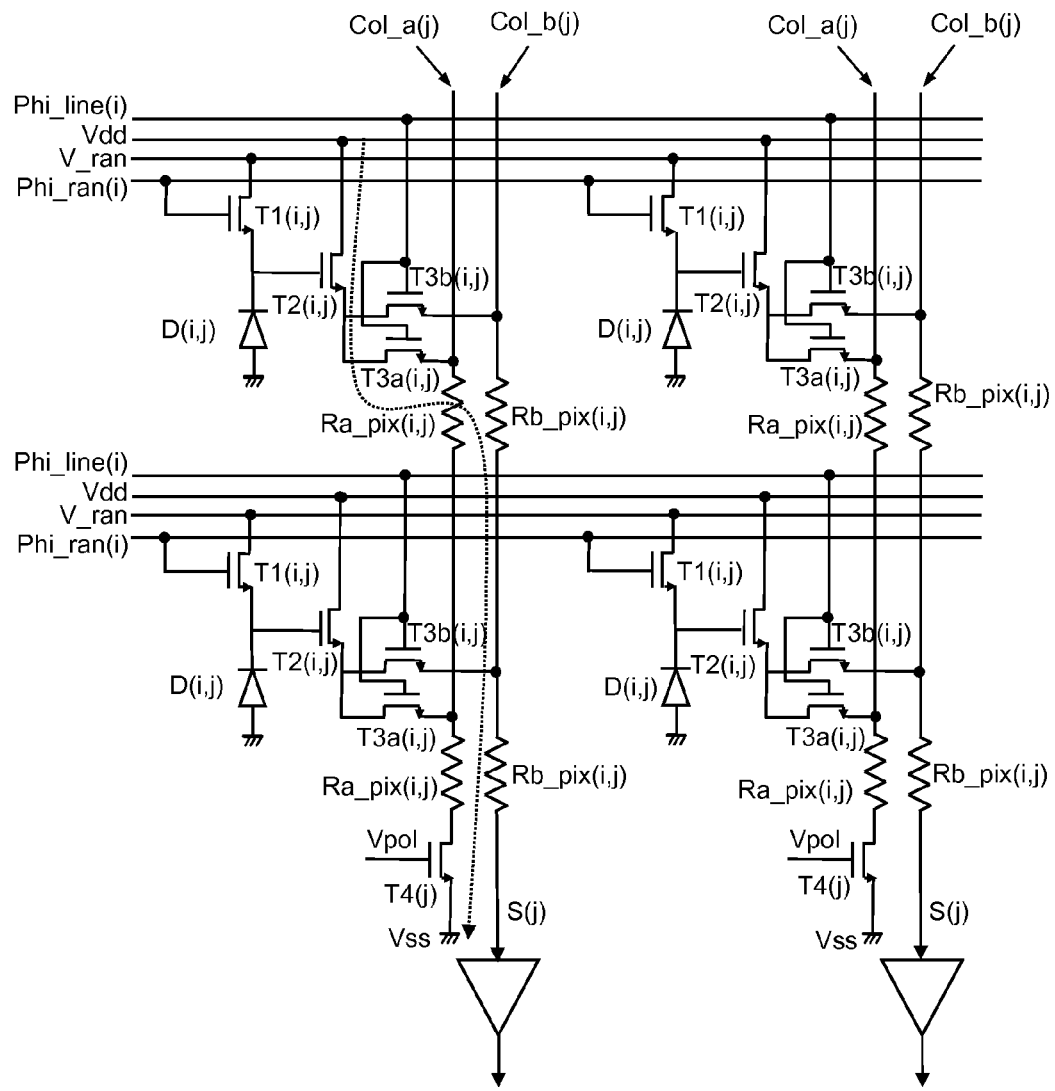
FIGS. 2 and 3 schematically represent two variants of an imaging device according to a first embodiment of the invention.

FIG. 2 represents an imaging device comprising a matrix of two rows and two columns. Four pixels are formed, each at the intersection of a row and a column. The labels of the various electronic components, specific to each pixel, are followed by two coordinates (i,j) that can take the rank of the row for i and the rank of the column for j. Certain components of the device comprise only a single coordinate j. These components are common to a column of pixels.

Each pixel comprises a photosensitive zone represented here by a photodiode D whose anode is linked to an earth of the device. It is possible to implement other types of photosensitive components such as for example a phototransistor or a photoresistor. During an image capture phase and under the effect of illumination, the photosensitive component accumulates a charge current which, in the example represented, lowers the potential of the cathode of the photodiode D.

In each pixel, a first transistor T1 allows the reinitialization of the voltage of the cathode of the photodiode D to a potential V_ran carried by a row conductor of the matrix and applied to the drain of the transistor T1. The source of the transistor T1 is linked to the cathode of the photodiode D. A control signal Phi_ran carried by a row conductor of the matrix is applied to the gate of the transistor T1. During a phase of reinitializing the device, the control signal Phi_ran is active and turns on the transistor T1. This phase precedes the image capture phase.

Each pixel comprises a second transistor T2 delivering at its source a voltage equal to that of the cathode of the photodiode D connected to the gate of the transistor T2. The drain of the transistor T2 is joined to a row conductor carrying a polarization potential Vdd for example of the order of 3.3V. The potentials V_ran and Vdd may be identical.

Each pixel comprises an electronic switch formed by a third transistor T3b making it possible to connect the source of the transistor T2 to a data conductor Col_b associated with a row of pixels and in the example of FIG. 2, a column of pixels. The data conductor Col_b is sometimes called a data bus. The drain of the transistor T3b is joined to the source of the transistor T2 and the source of the transistor T3b is joined to the data conductor Col_b. The electronic switch is actuated by means of a selection signal Phi_line carried by a row conductor of the matrix. This conductor is joined to the gate of the transistor T3b.

The device comprises several data conductors Col_b designed to transport respectively the signal delivered by several pixels to which they are linked by way of transistors T3b, specific to each pixel, and which has been selected with the aid of the selection signal Phi_line. The transistor T2 is designed to copy the potential of the cathode of the photodiode D and reproduce it, to within a voltage shift, over to the data conductor Col_b considered. The potential of the cathode of the photodiode D is thereafter read by a reading circuit S situated at the end of the data conductor Col_b.

To carry out its copyover, the transistor T2 requires a bias current flowing from its drain to its source. This current is imposed by a current generator formed by a transistor T4 common to several pixels. In the example represented, the transistor T4 is common to a column of pixels.

According to the invention, each of the pixels of the matrix furthermore comprises a second electronic switch distinct from the first electronic switch, joined to the output of the follower amplifier, formed by the source of the transistor T2, and enabling the current arising from the transistor T4 to flow. The second electronic switch is formed by a transistor T3a whose drain is joined to the source of the transistor T2 and whose source is joined to a current-supply conductor Col_a, at the end of which the transistor T4 is situated. Here also, the supply conductor Col_a is sometimes called the power supply bus. The current-supply conductor Col_a is linked to all the pixels of one and the same column. The gates of the transistors T3a and T3b are joined together so that the selection signal Phi_line controls the opening and the closing of the two transistors T3a and T3b.

The matrix of pixels is produced on a substrate. The reading circuit S and the current generator T4 are disposed on the substrate in the vicinity of one and the same edge of the substrate.

The transistor T4, common to a column of pixels, is here an N-channel transistor. Its drain is linked to the current-supply conductor Col_a, its source is linked to the earth of the device and its gate to the voltage Vpol. The transistor T4 is current-source biased.

The current-supply conductor Col_a is distinct from the data conductor Col_b for one and the same column. On each of the conductor Col_a and Col_b have been represented resistances, respectively Ra_pix and Rb_pix, at the level of each pixel. These resistances represent a distributed lineal resistance of the conductor forming the conductor considered.

During a phase of reading the pixel, the phase following the image capture phase, it is desired to receive as input from the reading circuit S an image of the potential of the cathode of the photodiode D, to within a voltage shift.

During a phase of reading the matrix, the various rows of the matrix are selected in succession. When a row is selected, the corresponding transistors T2, T3a, T3b and T4 situated at the column end are activated in such a way that a bias current for the transistor T2, represented dotted in FIG. 2 for the pixel with coordinates (1,1) situated at the top left of FIG. 2, flows in the transistors T2, T3a and T4.

A voltage drop due to the lineal resistance Ra_pix occurs along the current-supply conductor Col_a. On this conductor, the potential read by the transistor T2 therefore undergoes an ohmic drop, dependent on the height of the pixel in the matrix as one moves away from the selected pixel.

On the other hand, the switch T3b, the data conductor Col_b and the reading circuit S constitute a device for reading the output voltage of the pixel which operates without current on the data conductor Col_b and therefore measures the output voltage of the pixel without skew.

The putting in place of an dual output switch T3a and T3b of the pixel, and of two conductors Col_a and Col_b therefore makes it possible to circumvent the ohmic drops on the path which goes from the pixel to the reading circuit S situated at the end of the conductor to which the pixel considered is joined.

Figure 1:
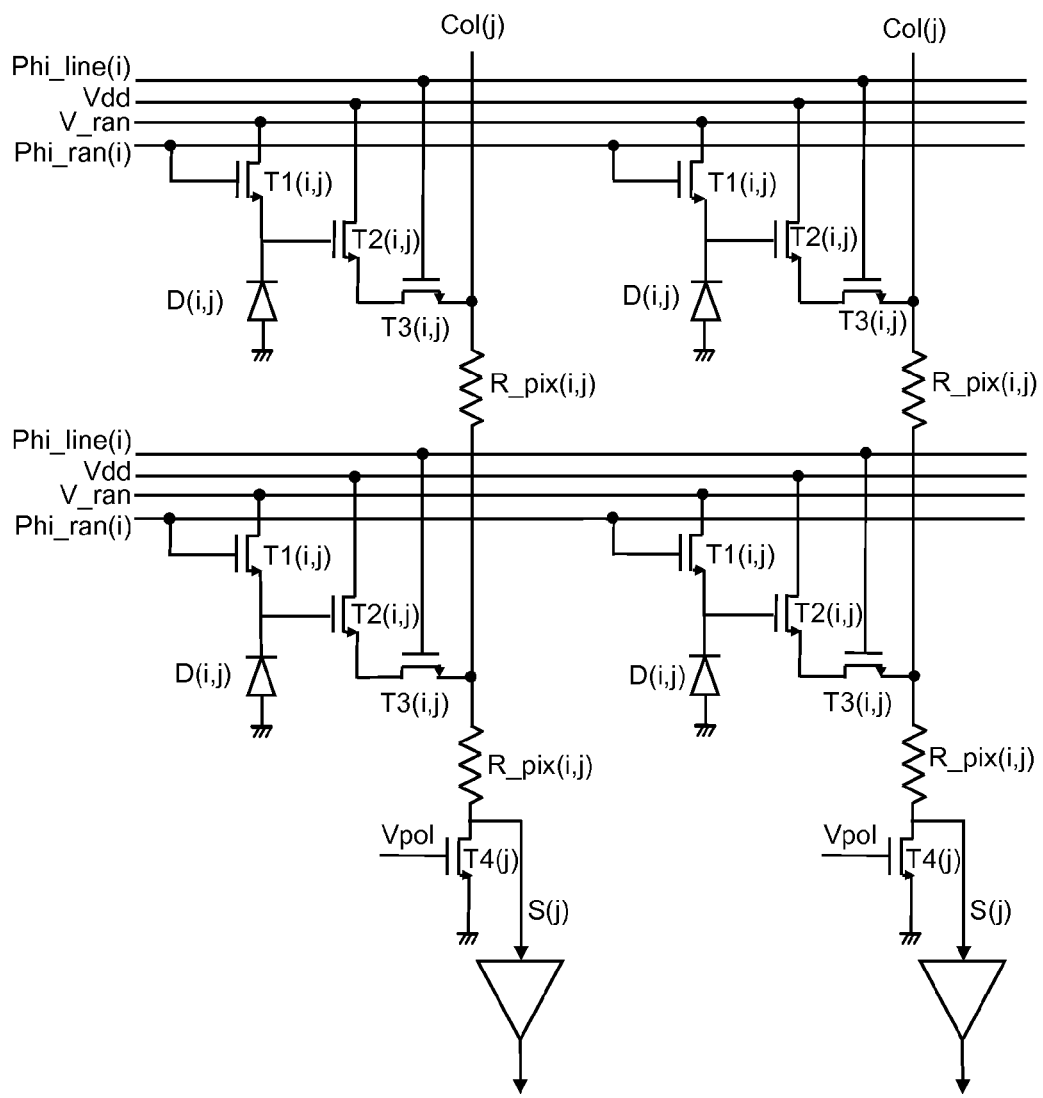
FIG. 1 represents a matrix of pixels such as is produced in the prior art and described above.
Figure 3:
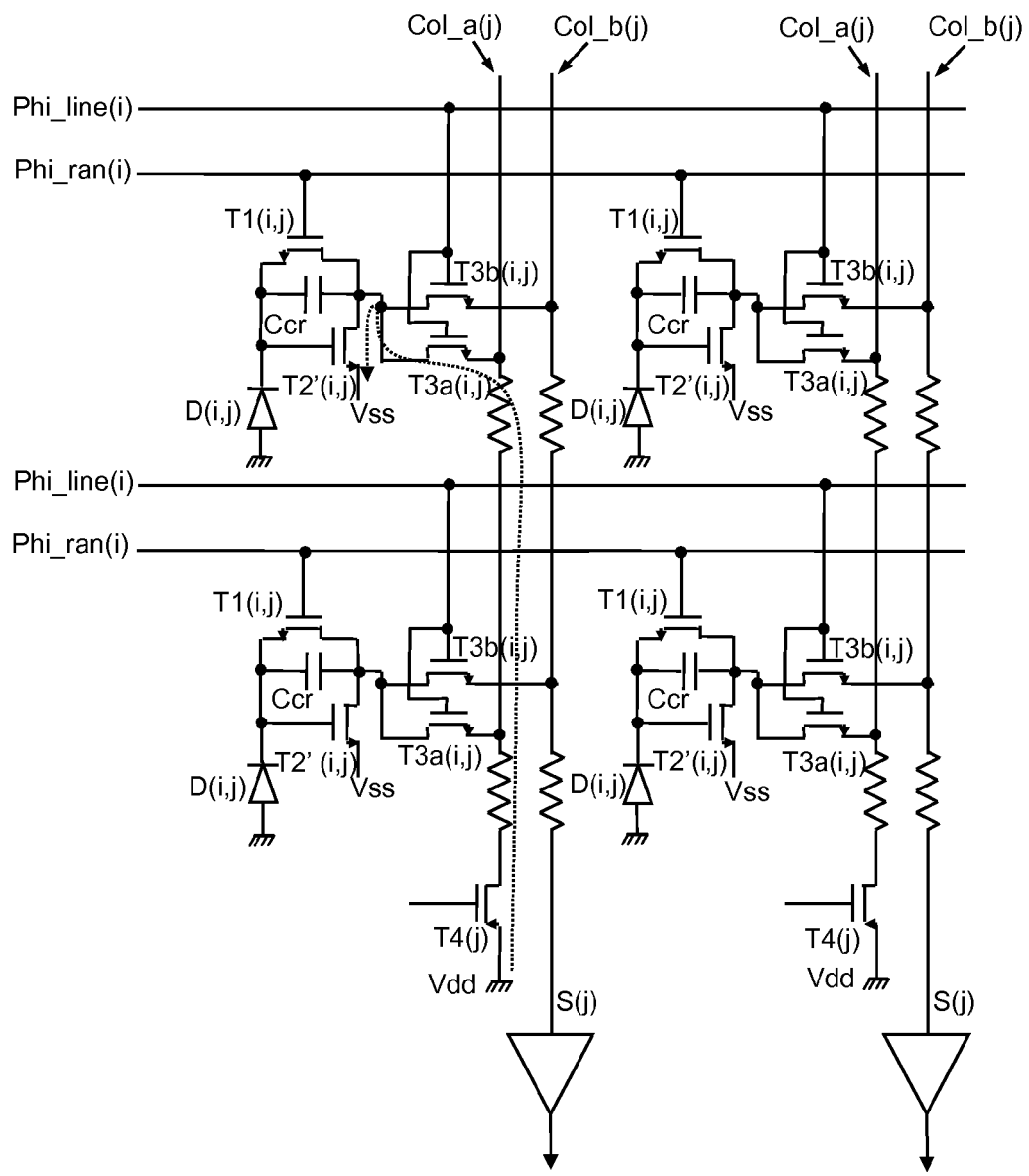

FIG. 3 represents a variant of the imaging device of FIG. 2 comprising a matrix of two rows and two columns. As in FIG. 1, each pixel of FIG. 2 features a photodiode D forming the photosensitive element, the transistor T1 allowing the reinitialization of the voltage of the cathode of the photodiode D as well as the two output switches T3a and T3b of the pixel ensuring the connection of the latter to the two conductors, respectively Col_a and Col_b. In this variant, a transistor T2', replacing the transistor T2, makes it possible to amplify the voltage present on the cathode of the photodiode D. This type of pixel is called an amplifier-pixel and is well known in the literature by the name CTIA pixel, for "Charge Trans Impedance Amplifier".

In each of the pixels, a feedback capacitor Ccr is disposed between the gate and the drain of the transistor T2'. The charges delivered by the photodiode D are positioned on the feedback capacitor Ccr during the phase of reading the pixel when the latter is selected. The common point of the two output switches T3a and T3b (the drain of the two transistors T3a and T3b) is linked to the drain of T2'. This point forms the node of the pixel that can be connected to the two conductors Col_a and Col_b when the switches T3a and T3b are closed under the action of the selection signal Phi_line. The source of the transistor T2' is linked to the voltage Vss, generally the earth of the device. The transistor T1, makes it possible, during the reinitialization of the pixel, to short-circuit the feedback capacitor Ccr. The drain of the transistors T1 and T2' are linked and the source of the transistor T1 is linked to the cathode of the photodiode D. The transistor T1 is controlled by the control signal Phi_ran applied to its gate.

The transistor T4, common to a column of pixels, is here a P-channel transistor. Its drain is linked to the current-supply conductor Col_a, its source is linked to the voltage source Vdd and its gate to the voltage Vpol.

The bias current for the transistor T2 is represented dotted in FIG. 3 for the pixel with coordinates (1,1) situated at the top left of FIG. 3, flows in the transistors T2, T3a and T4. As in the variant of FIG. 2, this current flows in the current-supply conductor Col_a and not in the data conductor Col_b.

The current-generator function, carried out in the layouts of FIGS. 2 and 3 by the transistor T4, can also be carried out by much more complex layouts.

It is also possible to use just a single current-source transistor T4, for the whole of the matrix, on condition that it is switched successively onto the columns, in tandem with the reading of these same columns.

The solution represented in FIGS. 2 and 3 nonetheless presents a limitation, since it is necessary to reduce the ohmic drop on the various current-supply conductors Col_a, to prevent the transistors T4 from desaturating, and then losing their current-source function. This reduction in ohmic drop is done by reducing the lineal resistance Ra_pix by means of an increase in the width of the conducting tracks forming this conductor, thereby increasing the stray capacitances related to the current-supply conductor Col_a.

Now, when the addressing passes from one row to the next, it is possible for the output voltage of the new pixel connected to a column to be very different from that of the previous pixel. It is then necessary to charge the two conductors Col_a and Col_b to the new voltage value. And in order for this to be fast, this requires the current generator T4 to be powerful, thereby creating current consumption, and which moreover also creates the ohmic drop in the various current-supply conductors Col_a, whereas this is what one wanted to avoid.

During the reading phase, the stray capacitances of the current-supply conductor Col_a also make it necessary to slow the speed for passing from one row to the other of the matrix, which increases the matrix reading time.

Figure 4:
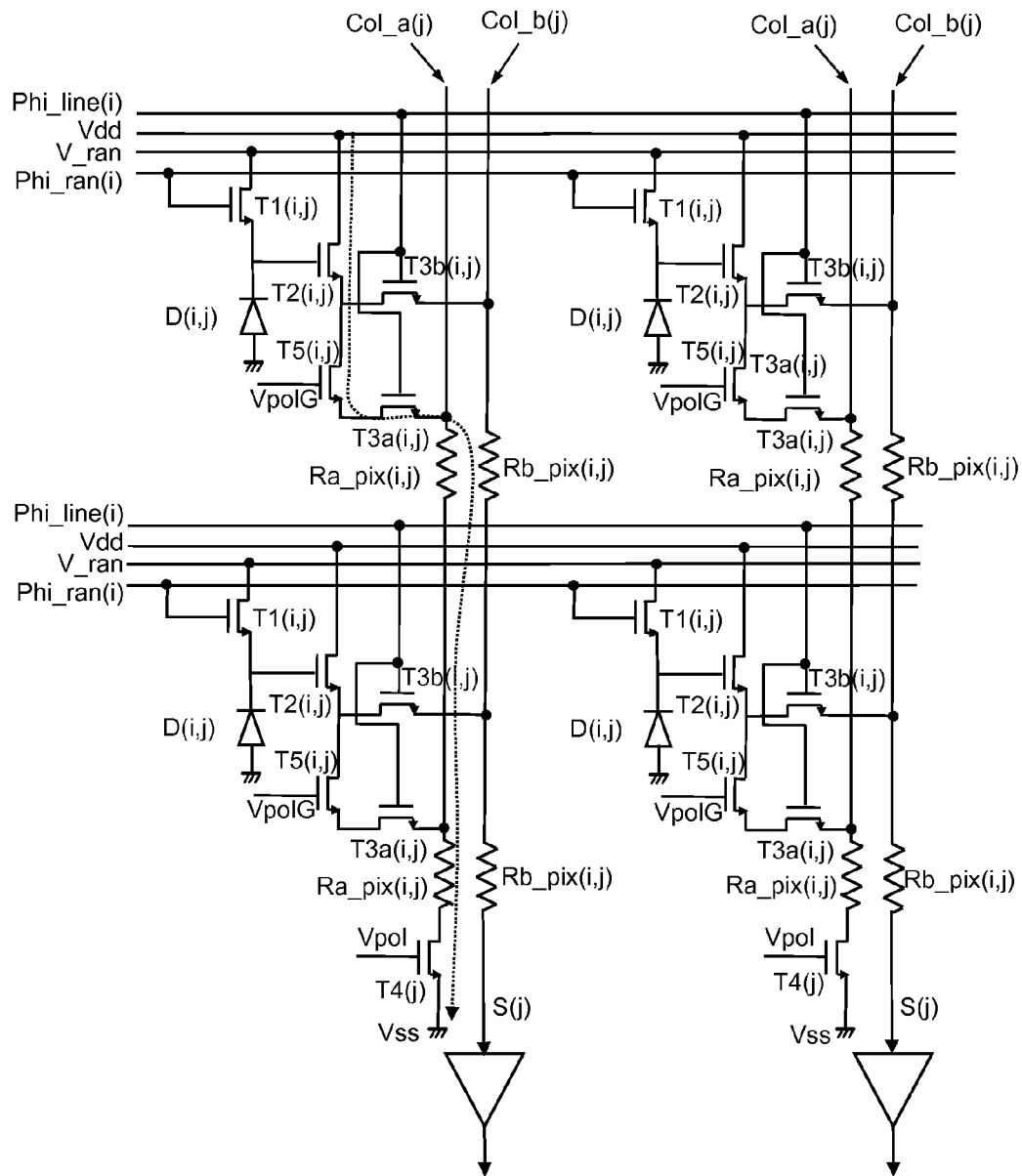
FIG. 4 represents a second embodiment of an imaging device according to the invention.

The embodiment of FIG. 4 makes it possible to solve this problem.

With respect to the layout of FIG. 2, in each pixel, a new transistor T5 is inserted between the source of the transistor T2 and the switch T3a. Its drain is linked to the source of the transistor T2 and its source is linked to the drain of the transistor T3a.

The gates of the transistors T5 of the various pixels are together connected to one and the same voltage VpolG. This voltage not drawing any current, can therefore be routed either with row conductors, column conductors, or gate-wise. This routing is not represented in FIG. 4.

The voltage VpolG is chosen in such a way that the transistors T5 are common-gate biased. More precisely, the transistor T5 operates in saturated mode. The flux of electrons, emitted by the current generator T4, must be conveyed to the transistor T2. It fixes the potential of its source, and therefore of the current-supply conductor Col_a, as a function of its dimensions on the substrate bearing the matrix and as a function of the flux of electrons emitted by the transistor T4.

The voltage VpolG must not be too low, so that the potential of the drain of the transistor T4 which is deduced therefrom remains sufficient for the transistor T4 to therefore remain in saturated mode and thus fulfill its current-generator function.

The transistor T5 therefore ensures the independence, in a certain span of voltages, of its source voltage with respect to its drain voltage on account of its saturated state. Its drain potential, that is to say the potential of the source of the transistor T2, and therefore the potential of the data conductor Col_b, therefore becomes independent of the potential of the current-supply conductor Col_a. The transistor T5, seen from the output node of the pixel, that is to say the source of the transistor T2, behaves as a current source. It resites locally, at the level of each pixel, the current-generator function ensured by the transistor T4.

The potential of the current-supply conductor Col_a does not depend on the voltage of the cathode of the photodiode D of the pixel being read. The potential of the current-supply conductor Col_a depends on the height of the pixel read from the matrix, by way of the lineal resistance of the conductor forming the current-supply conductor Col_a: "n×Ra_pix". But this variation is small when passing from one row to the next in contradistinction to the first embodiment represented in FIGS. 2 and 3 where this variation depended on the potential of the cathode of the photodiode D of the pixel being read. In the embodiment of FIG. 4, the quantity of charges to be carried on the current-supply conductor Col_a when passing from one row to the next is therefore small. It is therefore possible to design a wide track, which will reduce the ohmic drop without the capacitive effect due to this wide track impairing the matrix reading speed.

Employing this transistor T5, and its bias state, an almost identical potential is therefore obtained on the current-supply conductor Col_a, when the addressing of the matrix passes from one row to the next, whatever the information of the two successive pixels read on one and the same column. That is to say what was sought.

It is of course possible to implement means for rendering the potential of the node of the pixel independent of the position of the pixel along the current-supply conductor (Col_a), which are embodied by means of the transistor T5, in the variant represented in FIG. 3.

The invention claimed is:

1. An imaging device comprising:
   a matrix of pixels,
   at least one data conductor connected to several pixels of the matrix, organized row-wise and to successively transport signals delivered by respectively each of the pixels of the row, and
   an electronic current generator supplying several pixels, each of the pixels of the matrix comprising:
   a transistor delivering at one of its terminals, termed a node of the pixel, the signal delivered by the pixel considered and in which there flows a bias current arising from the current generator, and
   a first electronic switch making it possible to connect the node of the pixel to the data conductor associated with this pixel as a function of a selection signal of the pixel, each of the pixels of the matrix further comprising a second electronic switch, distinct from the first electronic switch, joined to the node of the pixel so that the current arising from the generator flows in the transistor as a function of the selection signal for the pixel.

2. The device as claimed in claim 1, further comprising at least one current-supply conductor joined to all the pixels using the same current generator, wherein the current-supply conductor is distinct from the data conductor, and wherein the current-supply conductor connects the current generator to the first and second electronic switches.

3. The device as claimed in claim 2, wherein each pixel comprises a second transistor whose drain source link is disposed between the node of the pixel and the second electronic switch, the second transistor operating in a saturated state to render the potential of the node of the pixel independent of the position of the pixel along the current-supply conductor.

4. The device as claimed in claim 3, wherein the electronic current generator is common to all the pixels of a row.

5. The device as claimed in claim 3, wherein the matrix of pixels is produced on a substrate, wherein the data conductor is joined to a reading circuit of the row of pixels and wherein the reading circuit and the current generator are disposed on the substrate.

6. The device as claimed in claim 2, wherein the electronic current generator is common to all the pixels of a row.

7. The device as claimed in claim 2, wherein the matrix of pixels is produced on a substrate, wherein the data conductor is joined to a reading circuit of the row of pixels and wherein the reading circuit and the current generator are disposed on the substrate.

8. The device as claimed in claim 1, wherein the electronic current generator is common to all the pixels of a row.

9. The device as claimed in claim 8, wherein the matrix of pixels is produced on a substrate, wherein the data conductor is joined to a reading circuit of the row of pixels and wherein the reading circuit and the current generator are disposed on the substrate.

10. The device as claimed in claim 1, wherein the matrix of pixels is produced on a substrate, wherein the data conductor is joined to a reading circuit of the row of pixels and in that the reading circuit and the current generator are disposed on the substrate.

11. The device as claimed in claim 1, wherein the first electronic switch and the second electronic switch and are both tied to and controlled by the selection signal.

* * * * *